United States Patent [19]

Hsu et al.

[11] Patent Number: 5,422,872
[45] Date of Patent: Jun. 6, 1995

[54] TELECENTRIC ROTARY ACTUATOR IN AN OPTICAL RECORDING SYSTEM

[75] Inventors: Sunny K. Hsu, Sunnyvale; Charles B. Abate, San Jose, both of Calif.

[73] Assignee: Maxoptix Corporation, San Jose, Calif.

[21] Appl. No.: 27,950

[22] Filed: Mar. 8, 1993

[51] Int. Cl.[6] .................................................. G11B 3/74
[52] U.S. Cl. ........................... 369/97; 369/44.18; 369/44.28; 369/44.23; 369/119
[58] Field of Search ............... 369/44.11, 44.14, 44.15, 369/44.18, 44.17, 44.23, 44.24, 118, 119, 44.27, 44.29, 44.28, 97; 359/663, 217, 218, 209, 386

[56] References Cited

U.S. PATENT DOCUMENTS

| | | | |
|---|---|---|---|
| 3,959,581 | 5/1976 | Laub | 369/44.11 |
| 4,199,219 | 4/1980 | Suzki et al. | 359/209 |
| 4,223,348 | 9/1980 | Oinoue et al. | 369/44.23 |
| 4,280,858 | 4/1981 | Beiser | 369/97 |
| 4,556,964 | 12/1985 | Trethewey | 369/44.14 |
| 4,592,625 | 6/1986 | Uehara et al. | 359/663 |
| 4,688,201 | 8/1987 | Towner et al. | 369/119 |
| 4,815,067 | 3/1989 | Webster et al. | 369/97 |
| 5,039,214 | 8/1991 | Nagata et al. | 359/386 |
| 5,151,890 | 9/1992 | Yonekubo | 369/44.14 |
| 5,224,088 | 6/1993 | Atiya | 369/44.18 |
| 5,253,245 | 10/1993 | Rabedeau | 369/119 |

FOREIGN PATENT DOCUMENTS

| | | | |
|---|---|---|---|
| 60-59542 | 4/1985 | Japan | 369/119 |
| 62-78731 | 4/1987 | Japan | 369/44.23 |
| 62-183418 | 8/1987 | Japan | 359/663 |

*Primary Examiner*—Georgia Y. Epps
*Assistant Examiner*—Nabil Hindi
*Attorney, Agent, or Firm*—Blakely, Sokoloff, Taylor & Zafman

[57] ABSTRACT

A telecentric rotary actuary in an optical storage system. A laser generates a laser beam which is focused by an objective lens onto an optical disk in order to write data to and read data from the optical disk. In performing a seek, a galvo rotates a mirror in order to reflect the laser beam to different radial displacements in reference to the optical disk. The position of the laser beam is detected, and a rotary actuator, to which the objective lens is attached, follows the movement of the laser beam. A telecentric optical system comprising a relay lens and an image lens is used to minimize an offset between the laser beam and the objective lens. The relay lens focuses the laser beam to a back focal point. The image lens optically conjugates the back focal point to a front focal point corresponding to the objective lens in order to demagnify any offset.

17 Claims, 2 Drawing Sheets

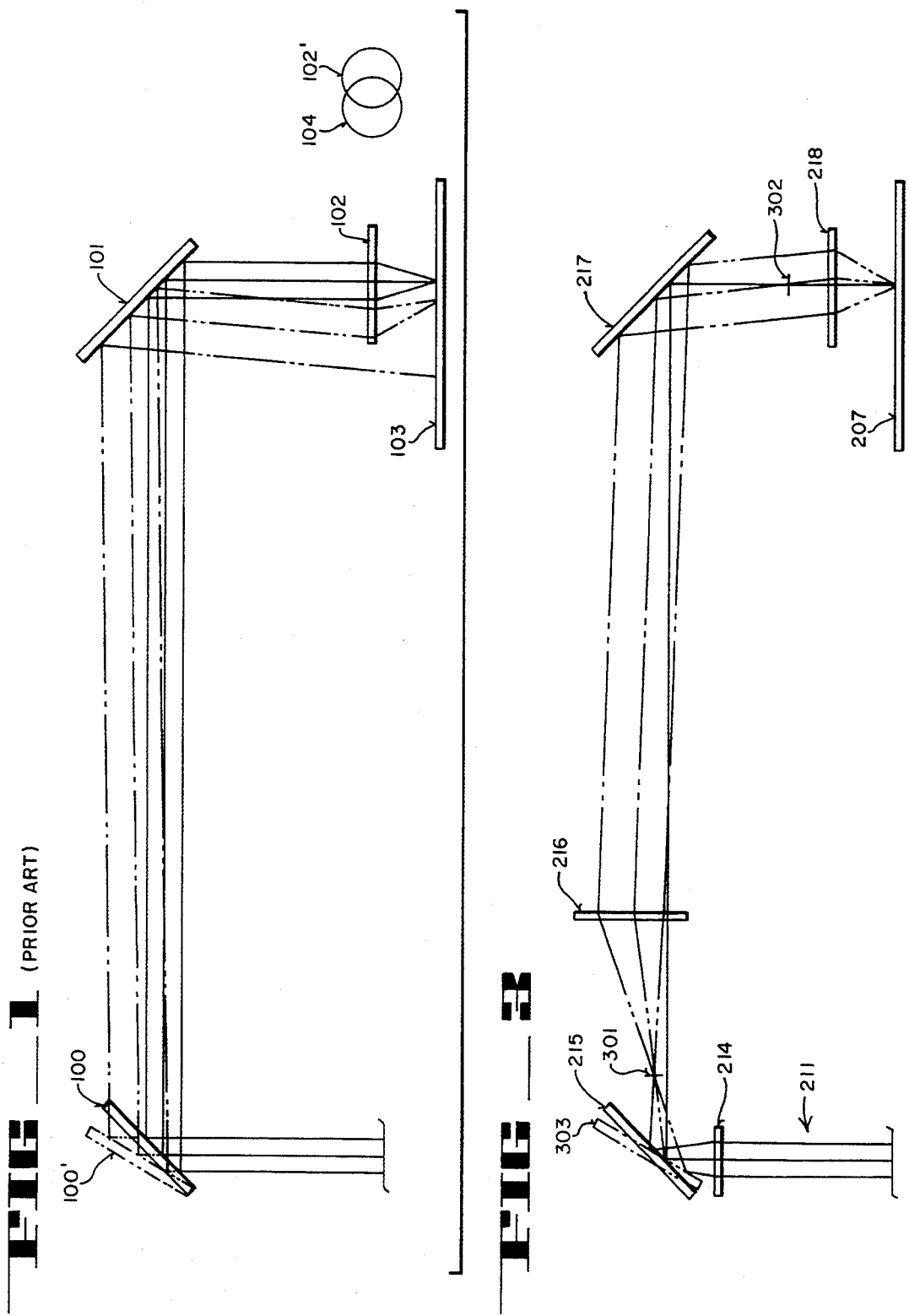

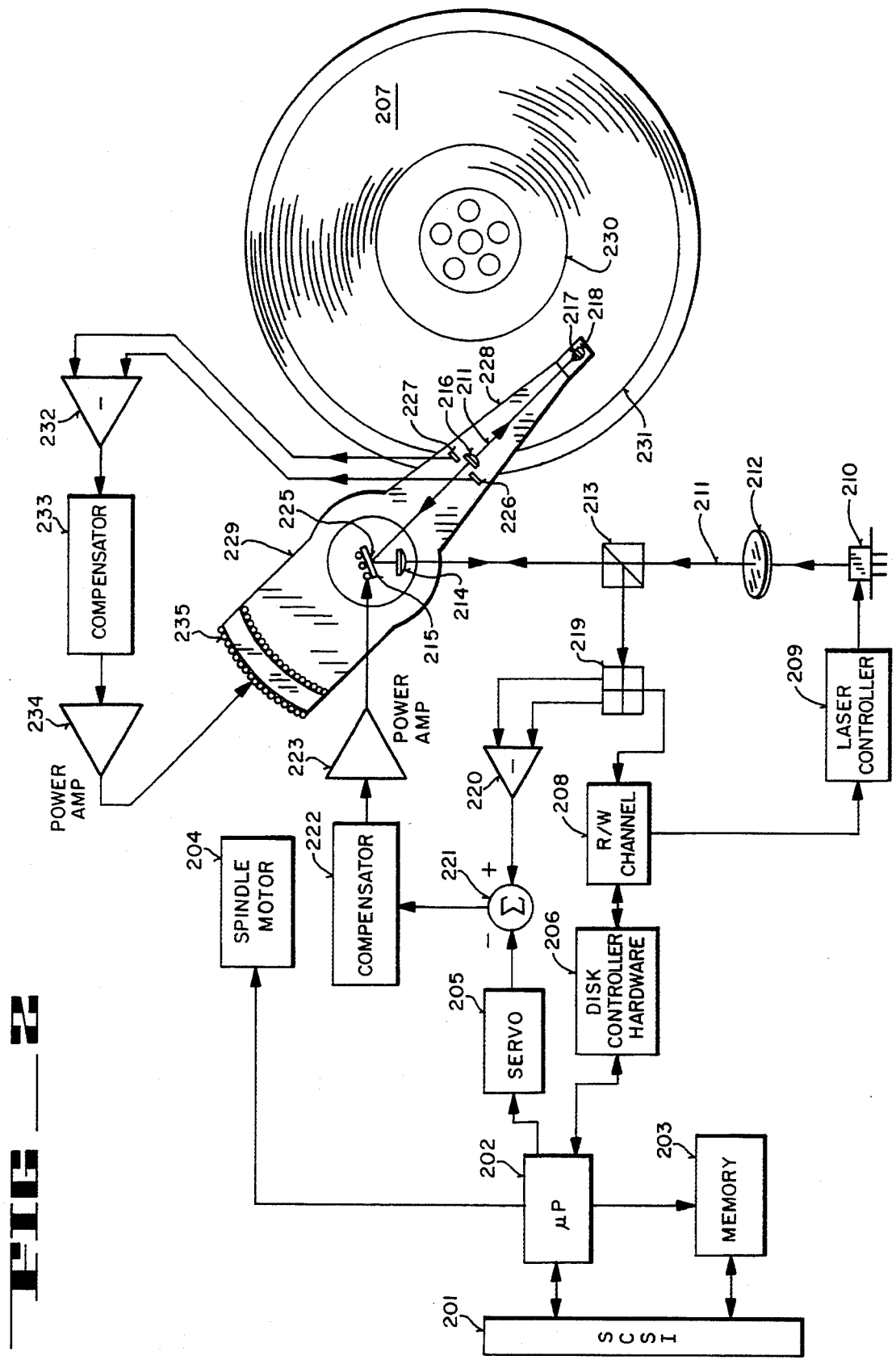
FIG._2

TELECENTRIC ROTARY ACTUATOR IN AN OPTICAL RECORDING SYSTEM

FIELD OF THE INVENTION

The present invention pertains to the field of optical recording systems. More particularly, the present invention relates to a telecentric rotary actuator system for use in an optical recording system.

BACKGROUND OF THE INVENTION

Optical-based recording systems such as compact-disk read only memory (CD ROM), video disk, write once read many (WORM), etc., are gaining wide acceptance in the marketplace because of their high storage capacity, random access capability, and relatively low cost. Moreover, erasable optical data storage systems (e.g., magneto-optical disk drives) are now commercially available, wherein old data stored on the optical media can be erased and new data written in place thereof.

The basic principle underlying typical optical recording systems involves the use of a light beam to write data to and read data from an optical medium. Typically, data is represented as a series of digital bits. A light source, such as a laser, is focused and directed by a lens assembly onto a circular optical disk. The disk is rotated about a spindle. By pulsing the laser, data is stored digitally onto the spinning optical disk. Subsequently, the stored data is read from the optical disk by detecting the light beam reflected from the optical disk.

A servo mechanism is used to locate the light beam in reference to fixed radial locations over the disk surface. Hence, the light beam is repositioned among numerous radial positions. As the servo mechanism sequentially moves the light beam radially across the spinning optical disk, a spiral, nearly-concentric circular groove, referred to as a "track," is described on the optical disk. It is onto the surfaces of these tracks that digital information is stored.

Accessing a different track involves utilizing the servo mechanism to position the lens assembly so that the beam is focused onto the target track. This process is known as a "seek." Often, data is written in a random manner. Consequently, a number of seeks are performed for a single disk access. Since data cannot be written onto nor retrieved from the disk when a seek is in progress, it is important to complete the seek as fast as possible in order to minimize undue delays. Furthermore, given that the tracks are approximately one to two microns in width, it is imperative for the seek to be very precise. Otherwise, the seek would fail.

In many prior art optical recording systems, the laser and the detector along with the lens assembly are moved as a package when performing a seek. Although this simple, straightforward seek method is precise, it is extremely slow. The optics package constitutes a relatively large mass which renders it rather difficult to accelerate and decelerate quickly. In other words, it has a relative long seek time due to its weight. Moreover, moving such a heavy optics package entails excessive power consumption. For portable, battery-operated systems, conserving power is critical.

One method for reducing the payload of the actuator involves replacing the focusing motor with a focusing relay lens actuator situated in the fixed optics area. Similarly, the tracking function can be accomplished by utilizing a tracking relay lens actuator also situated in the fixed optics area. In regards to the focus relay lens, the longitudinal motion of the relay lens is optically de-magnified by the image lens relative to the square of the focal length ratio. As regarding the tracking relay lens, the lateral de-magnification is linearly proportional to the focal length ratio. This means that the actuators would be required to handle extremely high levels of acceleration in order to keep up with a relatively fast seek. With present lens actuator technology, the desired level of acceleration is extremely difficult if not impossible.

Another method for achieving a faster seek time involves implementing a plane mirror mounted on a galvo motor. As the galvo is pivoted, this causes the plane mirror to likewise pivot. Pivoting the plane mirror reflects the light beam at different angles. For fast seeking, a galvo fine tracking motor is implemented to maintain the light beam to the center of each track from take-off to landing. A coarse servo system for moving the lens is slaved to the movement of the light beam. Thus, in this approach, rather than moving the entire optics package, the laser, detectors and galvo remain fixed. Only the lens assembly are moved, resulting in a faster seek.

However, one serious drawback of this prior art seek scheme is that an offset is induced during the seek. When the seek is in the stages of take-off, switch-over, and landing, the coil currents for the linear coarse actuator and the galvo fine tracking motor have different rise time. This difference creates a momentary mismatch in their accelerations. Since the coarse actuator reacts slower than the fine tracking actuator, the principle ray of the laser beam is displaced from the optical axis of the objective lens. In turn, this causes the light spot reflected from the disk to be misaligned in relation to the tracking detector. Unfortunately, this develops an offset in the tracking error signal.

FIG. 1 shows a ray trace of a prior art galvo actuator system. The light beam from the laser, as represented by the solid lines, are reflected from the galvo mirror 100 to routing mirror 101. The light beam reflected from routing mirror 101 hits the objective lens 102 which focuses the light beam onto media 103. Because the light beam squarely hits the objective lens 102, there is no offset. However, as the galvo 100' is rotated to the objective lens 102, the new path of the light beam, as represented by the dashed lines, partially misses the objective lens 102. The top view of objective lens 102 is shown as 102'. The light beam associated with the rotated galvo is shown as 104. Note the offset. Moreover, for a linear coarse actuator system, the amount of offset is not only a function of the acceleration mismatching, but is also a function of the optical path length. The tracking offset introduces an error is the seek algorithm and can eventually lead to a seek failure if the offset become excessive.

Thus, there is a need in prior art optical recording systems for performing fast, precise seeks without using a relay lens system without introducing an offset. It would also be preferable for such a system to have low power dissipation.

SUMMARY AND OBJECTS OF THE INVENTION

The present invention relates to a telecentric rotary actuator for use in optical storage systems. A laser pen generates a laser beam which is collimated and reflected by a galvo mirror towards a routing mirror. The routing mirror directs the laser beam downwards to an objective lens. The objective lens focuses the laser beam onto an optical disk. By pulsing the laser, data can be written to and stored on the optical disk. In a read operation, the light modulated and reflected back from the optical disk is directed by a beam splitter to a detector.

When a seek is performed, the galvo rotates the galvo mirror about a pivot point. This causes the laser beam to be deflected radially in reference to the optical disk. The galvo is controlled by a servo signal and a tracking error signal. The position of the laser beam is detected. A rotary actuator having an arm extending out over the optical disk, to which the objective lens is attached, is slaved to the movement of the laser beam. Hence, when the rotary actuator is caused to rotate about the same pivot point, the objective lens is moved radially across the optical disk in sync with the laser beam.

In order to minimize any offset between the laser beam and the objective lens, a telecentric optical system is implemented in conjunction with the rotary actuator system. The telecentric optical system comprises a relay lens and an image lens. The relay lens focuses the laser beam to a back focal point. The image lens optically conjugates the back focal point to a front focal point corresponding to the objective lens, thereby minimizing any offset.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 shows a ray trace of a prior art galvo actuator system.

FIG. 2 shows one embodiment of the afocal telecentric rotary actuator of the present invention.

FIG. 3 shows an afocal telecentric lens assembly as may be utilized in the present invention.

DETAILED DESCRIPTION

A telecentric rotary actuator in an optical recording system is described. In the following description, numerous specific details, such as lens assemblies, focal lengths, apertures, wavelengths, track numbers, etc., are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Referring to FIG. 2, one embodiment of the afocal telecentric rotary actuator of the present invention is shown. The optical recording system can include a small computer standard interface (SCSI) 201, which provides an interface between the optical recording system and external equipment, such as a computer. The SCSI interface 201 is coupled to a microprocessor 202 and to memory 203. Microprocessor 202 is coupled to and controls the spindle motor 204, servo mechanism 205, and disk controller hardware 206 per a program stored in memory 203. Spindle motor 204 rotates disk 207 about a spindle. Servo mechanism 205 generates a servo signal which instructs the actuator system on the positioning of the read/write light beam for performing a seek. Disk controller hardware 206 receives data signals read from the media 207 through read/write channel 208. The read data is converted into a byte format and is transmitted to the host computer via SCSI 201.

When data is to be written to media 207, the disk controller hardware 206 converts the data into a format compatible for storage, such as a 2, 7 encoding schemes. The data signal is sent to read/write channel 208 which instructs laser controller 209 to control the power of laser pen 210. The same laser pen 210 is used to generate both the light beam used to write data onto the media 207 and the light beam reflected off media 207 for readback of data from media 207. By controlling the spindle motor 204, servo 205, and laser 210, the microprocessor 202 can effectively perform seeks to different tracks for read/write operations.

Laser pen 210 emits light which is manipulated by collimator 212 into a beam 211. The collimated light beam 211 passes through beam splitter 213 and relay lens 214. The light beam continues on its path and strikes galvo mirror 215, which reflects the beam through image lens 216. Next, the light beam is reflected downwards towards media 207 by routing mirror 217. Finally, an objective lens 218 focuses the light beam to a spot directed on the surface of media 207.

This same light beam is used to both write data onto media 207 and read data from media 207. When data is being written onto media 207, laser pen 210 generates a strong, high intensity light beam. When reading data, a weaker, less powerful light beam is directed onto media 207. The modulated light reflected back from media 207 passes through objective lens 218 and is reflected back through image lens 216 by routing mirror 217. Whereupon, the reflected light strikes routing mirror 215. Routing mirror 215 directs the reflected light back through relay lens 214 towards beam splitter 213. The function of beam splitter 213 is to route the reflected light to data and servo detector 219, instead of back to collimator 212 and laser pen 210. Detector 219 converts the light reflected from media 207 into an electrical signal. This resultant electrical signal contains data stored on the media 207. It is sent via read/write channel 208 to disk controller hardware 206, which converts it into a byte format recognized by the host computer.

The electrical signal from detector 219 also contains information regarding the position of the light beam spot. A diffraction pattern from the grooves corresponding to the tracks causes the light imaged back from media 207 to have an intensity distribution which is a function of the spot relative to the nearest track center. In other words, the electrical signal output from detector 2 19 is a function of the relative difference of the position of the light beam's spot to the nearest track center. For example, if the focus spot is positioned in the center of a track, the TES is zero. As the focus spot is moved away from the center point and towards a track boundary, the amplitude of the TES increases. This electrical signal is known as the tracking error signal (TES). The TES is amplified by difference amplifier 220. The amplified TES signal input to summer 221 to be summed with the servo signal provided by servo mechanism 205. Hence, the signal output from summer 221 represents the difference in distance between the present physical location of the spot relative to that of the destination track. The signal output from summer 221 is input to a loop compensator 222 which is used to determine the proper amount of current required to drive the galvo tracking motor coil 224. Power amplifier 223 is used to amplify the signal from compensation network 222 to the galvo tracking motor coil 224.

The galvo actuator rotates the galvo mirror 215 which, in turn, causes the light beam to sweep radially across media 207. The galvo actuator is comprised of one or more fixed magnets for producing a magnetic field. A moveable motor coil 224 is placed within the magnetic field. According to the principles of electromagnetics, passing a current through a magnetic field produces a force. It is this force induced by the current flowing through motor coil 224 supplied by power amplifier 223, which results in a torque acting upon galvo mirror 215. The torque causes galvo mirror 215 to rotate about a pivot point 225. As galvo mirror 215 is rotated, the light beam is swept radially across media 207.

Two elements 226 and 227 are mounted onto an arm 228 of rotary actuator 229. The two elements 226 and 227 are mounted on either side of light beam 211. As the light beam 211 is swept radially from the inner diameter 230 to the outer diameter 231 of media 207, the light beam hits element 226. Conversely, if light beam 211 is swept from outer diameter 231 to inner diameter 230, it hits element 227. When the light beam hits either one of the elements 226 and 227, it causes that element to generate an electrical signal, known as the lens position signal (LPS), which is sent to difference amplifier 232. Based on the amplified LPS signal input to compensator 233, a current required to drive the rotary actuator coil 235 is generated by compensator 233. Power amplifier 234 amplifies the signal output from compensator 233, and the amplified output is coupled to voice coil 235. Basically, rotary actuator 229 operates on the same principles as the galvo actuator described above.

The current supplied to voice coil 235 causes rotary actuator 229 to rotate about pivot point 225. This causes arm 228 to, likewise, rotate. In essence, movement of the rotary actuator 229 is slaved to that of the light beam 211. Attached to the tip of arm 228 is the objective lens 218. Thereby, objective lens 218 is caused to follow the movement of light beam 211 during a seek. In short, seek operations are performed closed loop. During a seek, the galvo actuator moves the light beam to the centers of each track from take-off to landing. This causes a position or angle offset between the optics (i.e., lens) axis and the laser beam axis. The offset is detected and an LPS signal is generated. Slaved by the LPS, the rotary actuator drives the objective lens to catch up with the light beam.

However, due to the fact that the galvo has less mass in comparison to that of the rotary actuator, it can be moved more quickly. During a seek, the actuators are initially subjected to maximum acceleration followed by a period of rapid acceleration. Due to the differences in mass, the rotary actuator 229 often lags the galvo actuator. In the currently preferred embodiment, the galvo actuator is designated to stay within a maximum of ±0.5° relative to the rotary actuator 229 from an ideal on-axis position. The 0.5° differential is equivalent to approximately ten tracks. Consequently, the difference of the rise times of the currents to the motor coils of the actuators is limited to producing no more than ten tracks of error. This lag can produce an offset of the light beam 211 relative to objective lens 218. This translates into an offset in the TES signal and affects the seek.

In order to minimize any offsets, an a focal telecentric lens assembly is implemented in the present invention. A telecentric lens assembly is designed to pivot the light beam about a focal point in front of the objective lens in order to minimize the motion of the light beam relative to the objective lens. In other words, the image created by the relay lens is optically refocused by the image lens so that it is focused to the prime focal point of the objective lens.

In designing such a system, the desired seek time is first determined. Next, the angular speed of the galvo actuator required to meet the desired seek time can be calculated. Based on the ratio of the mass of the galvo actuator to the mass of the rotary actuator and the galvo's speed, the resulting degree of offset can be determined. Given the offset, the requisite lens assembly to handle such an offset can be specified. In the currently preferred embodiment of the present invention, the lens assembly is designed so that for a 0.5° offset, the waveform quality of the light beam is maintained at 0.04 $\lambda$ root-means-square (RMS).

FIG. 3 shows an afocal telecentric lens assembly as may be utilized in the present invention. The light beam 211 is focused by relay lens 214 and reflected by galvo mirror 215 to a back focal point 301. Back focal point 301 is defined as a point on the axis of symmetry of the relay lens 214 to which the parallel incident rays of light beam 211 converge or from which they appear to diverge. The light beam is again focused and reflected, this time by image lens 216 and routing mirror 217. This results in a front focal point 302. The light beam is directed to objective lens 218 which focuses the light beam into a spot of a desired size onto the media 207. Consequently, the back focal point 301 of relay lens 214 is optically conjugated to the front focal point 302 of the objective lens 218 through image lens 216. Notice that the principal (paraxial) ray in the area between objective lens 218 and media 207 is parallel to the optical axis of the objective lens 218, independent of the angle of the galvo.

With this a focal telecentric arrangement, the galvo induced motion of the beam spot on the detector is minimized. In other words, the image created by the relay lens 214 is optically refocused by the image lens 216 so that it is focused to the prime focal point of the objective lens 218. With this design, the optical path length from the galvo's pivoting point 303 to the objective len's front focal point 302 should be kept constant. Thus, the offset of the tracking error signal stays at minimum despite the galvo motion. For a rotary actuator system, this telecentric optical compensation can correct the offset across media 207 from inner diameter to outer diameter because the optical path length from the galvo's pivoting point 303 to the objective lens' front focal point 302 stays constant.

The afocal telecentric optical system of the present invention can be scaled up or down. In scaling the optical system, the focal length of the relay lens should be made a fraction of the focal length of the image lens. The focal length of a lens is the distance of its focal point from the surface of the lens. Otherwise, if the focal length of the relay lens is made greater than that of the image lens, the galvo actuator will have to be moved excessively in order to create the necessary displacement of the focus spot for performing a seek. In the currently preferred embodiment, a ratio of the focal length of the image lens to the focal length of the relay lens is set to approximately three (i.e., $f_{image}/f_{relay} \cong 3$).

In the currently preferred embodiment of the present invention, the relay lens has an approximate focal length of 1.5 millimeter (mm), aperture of 1 mm, and field angle of 0.1 degrees. The wavelength range for the relay, image, and objective lens is approximately 780±20 nanometers. These lenses can be crafted by an optical manufacturer such as Pentax, Nikon, etc. It should be noted that the characteristics of these lenses can vary depending on how the optical system is scaled for accommodation in various optical recording systems.

Thus, a telecentric rotary actuator for an optical recording system is disclosed.

What is claimed is:

1. An optical recording system, comprising:
    a laser for emitting a light beam used to write data onto an optical medium and read data from said optical medium;
    an objective lens for focusing said light beam onto said optical medium;
    a mirror for reflecting said light beam emitted by said laser through said objective lens;
    a first actuator for rotating said mirror about a pivot point so that said light beam is reflected at a plurality of angles;
    a first servo mechanism for performing a seek by causing said first actuator to route said mirror about said pivot point in a manner wherein said light beam is moved from a starting track of said optical medium to a destination track of said optical medium;
    a detector for detecting a position of said light beam;
    a second actuator which also rotates about said pivot point, wherein said objective lens is fixedly attached to an end of an arm of said second actuator;
    a second servo mechanism for causing said second actuator to rotate said objective lens about said pivot point.

2. The optical recording system of claim 1 further comprising a telecentric optical system for minimizing an offset between said light beam and said objective lens.

3. The optical recording system of claim 2, wherein said telecentric optical system comprises:
    a relay lens residing between said laser and said mirror for generating a back focal point;
    an image lens for optically conjugating said back focal point to a front focal point of said objective lens.

4. The optical recording system of claim 3, wherein an optical path length from said pivoting point to said front focal point remains constant when performing said seek.

5. The optical recording system of claim 4, wherein a ratio of a focal length of said relay lens to a focal length of said image lens is approximately three.

6. The optical recording system of claim 5, wherein said first actuator is kept within 0.5 degrees rotation relative to said second actuator throughout said seek.

7. The optical recording system of claim 6, wherein said focal length of said relay lens is approximately 1.5 millimeters and said focal length of said image lens is approximately 4.5 millimeters.

8. The optical recording system of claim 7, wherein said relay lens has an aperture of approximately 1 millimeter, said image lens has an aperture of approximately 3 millimeters, and said objective lens has an aperture of approximately 1 millimeter.

9. The optical recording system of claim 8, wherein said relay lens has a field angle of approximately 0.1 degrees, said image lens has a field angle of approximately 0.5 degrees, and said objective lens has a field angle of approximately 0.5 degrees.

10. The optical recording system of claim 9, wherein said relay lens, said image lens, and said objective lens have a wavelength range of approximately 780 nanometers.

11. An optical storage system comprising:
    a storage means for optically storing digital data;
    a means for generating a laser beam for writing said digital data to and reading said digital data from said storage means;
    a first lens means for focusing said laser beam onto said storage means;
    a means for reflecting said laser beam through said first lens means;
    a compensation means for compensating an offset between said laser beam and said first lens means said compensation means comprising a second lens producing a first focal point of said laser beam and a third lens optically conjugating said first focal point to a second focal point:
    an actuator arm for rotating said reflecting means about a pivot point, wherein said laser beam is reflected at a plurality of angles;
    a means for controlling movement of said actuator arm, wherein said laser beam is moved from a first track of said storage means to a second track of said storage means;
    a means for detecting a position of said laser beam;
    a second movement means for rotating said first lens in accordance to said position of said laser beam, said second movement means also rotating about said pivot point.

12. The optical storage system of claim 11, wherein a ratio of a focal length of said second lens to a focal length of said third lens is approximately three.

13. The optical storage system of claim 12, wherein a distance from said pivoting point to said second focal point remains constant when said first lens is moved from said first track to said second track.

14. The optical storage system of claim 13, wherein said actuator arm is kept within 0.5 degrees rotation relative to said second movement means.

15. The optical storage system of claim 14, wherein said focal length of said second lens is approximately 1.5 millimeters and said focal length of said third lens is approximately 4.5 millimeters.

16. An optical recording system comprising:
    an optical disk for storing digital data;
    a laser for generating a laser beam used to write data to and read data from said disk;
    an objective lens for focusing said laser beam onto said disk;
    a mirror for reflecting said laser beam;
    a galvo for rotating said mirror about a pivot point according to a servo signal and a tracking error signal in order to position said laser beam from one radial position to another radial position of said disk;
    a rotary actuator having an arm, wherein said objective lens is attached to a tip of said arm, said rotary actuator rotating about said pivot point according to said position of said laser beam so that said objective lens is moved from said one radial position to said another radial position;
    a first servo for controlling a rotation of said galvo;
    a second servo for controlling a rotation of said rotary actuator;

a telecentric optical system mounted on said rotary actuator for minimizing an offset between said laser beam and said objective lens, said telecentric optical system including a first lens which focuses said laser beam to a first focal point, and a second lens which optically conjugates said first focal point to a second focal point corresponding to said objective lens, a distance from said pivot point to said second focal point remaining substantially constant, and wherein a ratio of a focal length of said first lens to a focal length of said second lens is approximately three.

17. The optical recording system of claim 16 further comprising a first element and a second element attached to said arm and straddling said laser beam, said elements generating a signal corresponding to said position of said laser beam.

* * * * *